United States Patent

[11] 3,543,678

[72] Inventor William Hobbs, Jr.
Lancaster, Pennsylvania
[21] Appl. No. 769,270
[22] Filed Oct. 21, 1968
[45] Patented Dec. 1, 1970
[73] Assignee Sperry Rand Corporation
New Holland, Pennsylvania
a corporation of Delaware

[54] FEEDER MECHANISM FOR A BALING MACHINE
10 Claims, 5 Drawing Figs.
[52] U.S. Cl. .................................................. 100/189;
56/341
[51] Int. Cl. ...................................................... A01f 17/02
[50] Field of Search .......................................... 100/188,
189, 142; 56/341, 364; 198/223, 75, 84, 86

[56] References Cited
UNITED STATES PATENTS
3,040,508 6/1962 Nolt et al. ..................... 100/189X
Primary Examiner—Edward L. Roberts
Attorney—Joseph A. Brown, John C. Thompson and James J. Kennedy ABSTRACT: A hay baling machine having feeding means comprising a pair of reciprocable carriages, with feeder fingers depending therefrom. The carriages ride in tracks mounted above a hay receiving platform and are adapted to convey hay from a remote end of the platform to an intermediate region thereof by one carriage and from the intermediate region to the bale chamber by the other carriage.

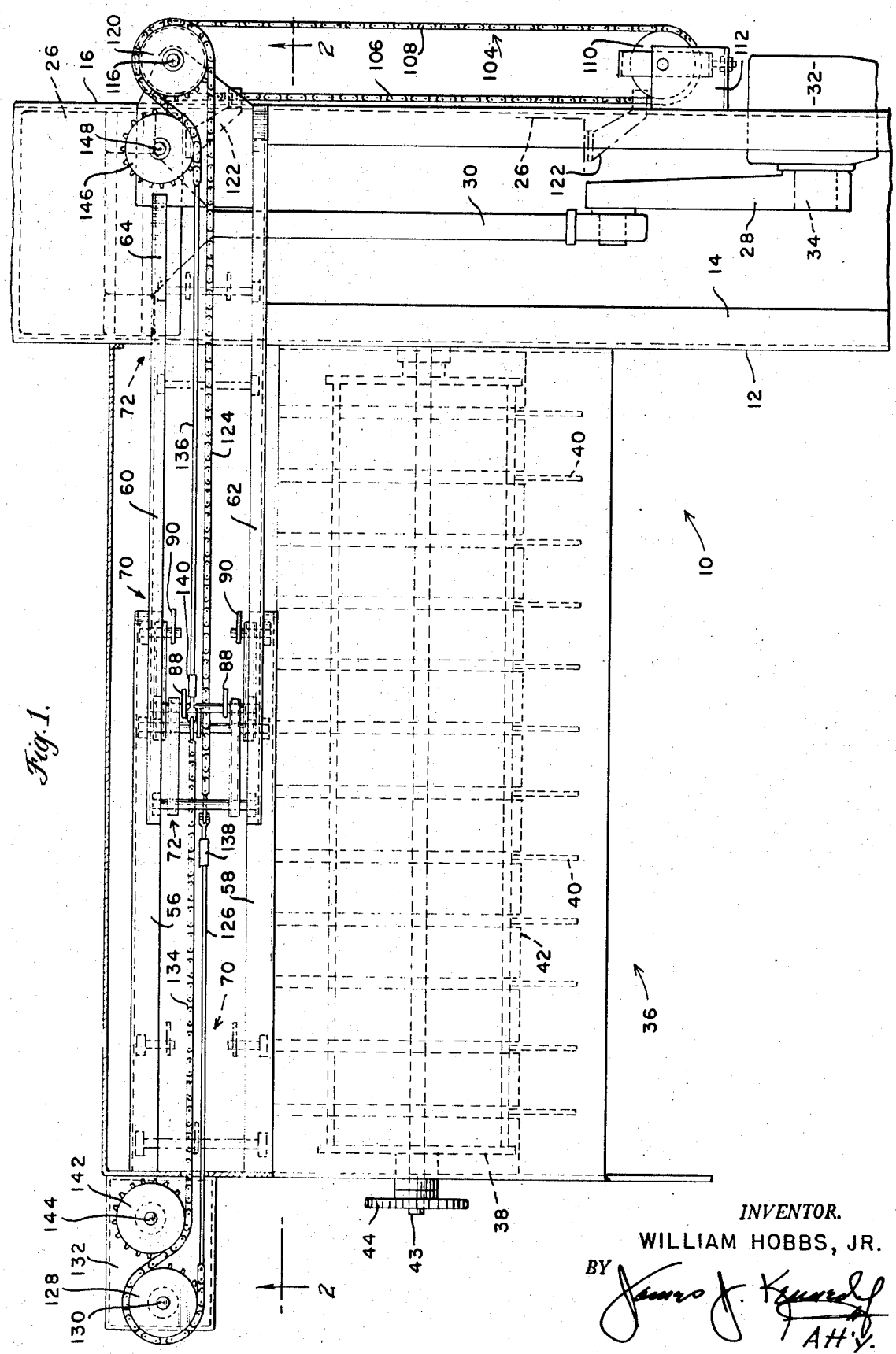

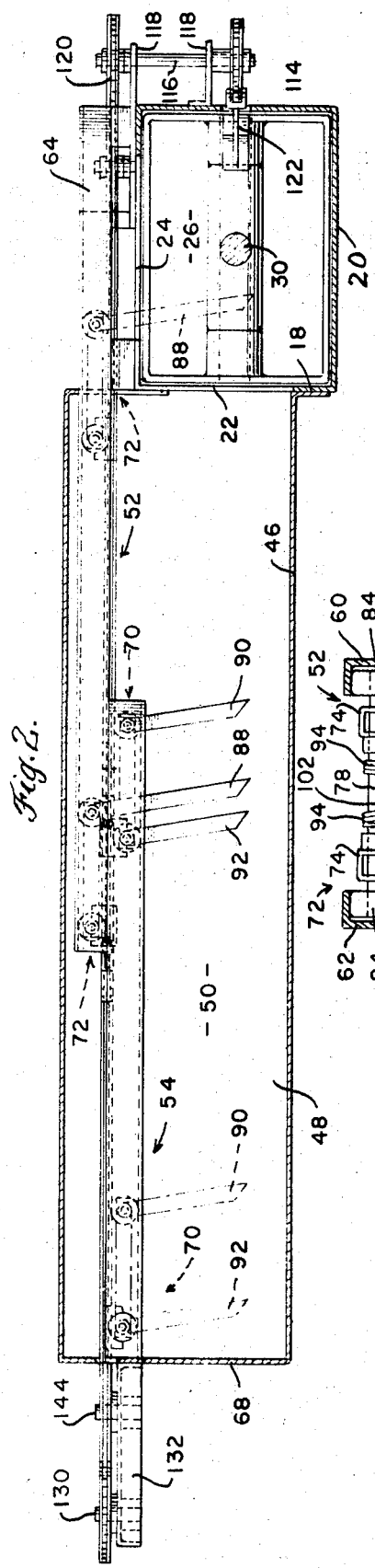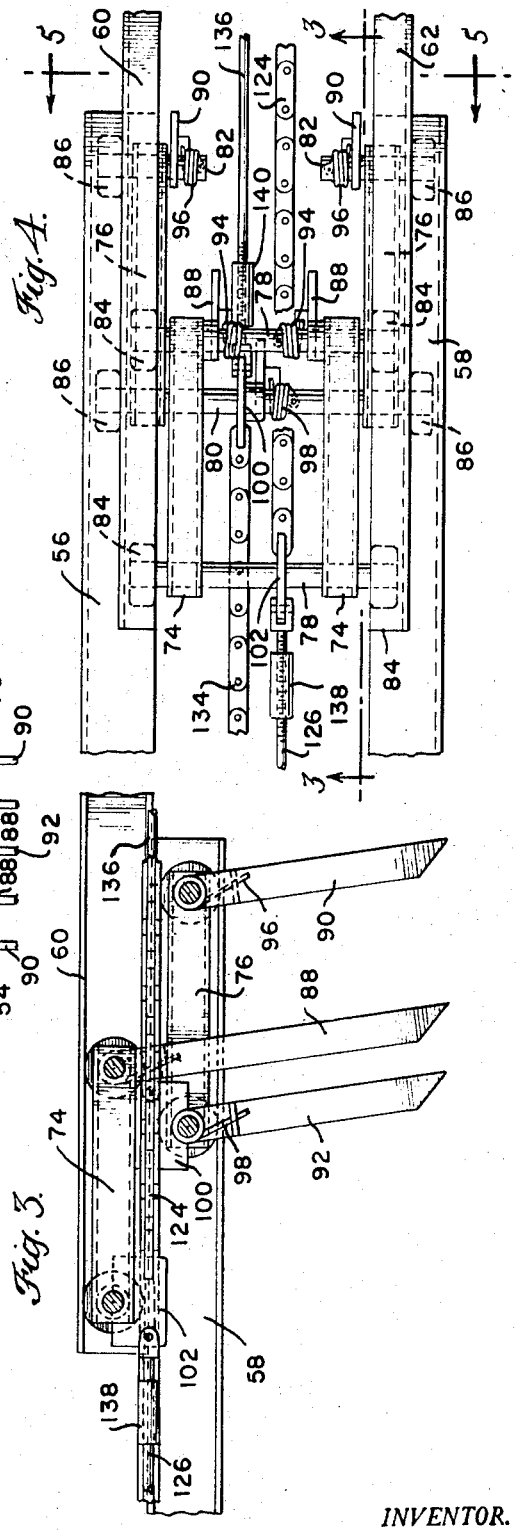

3,543,678

1

FEEDER MECHANISM FOR A BALING MACHINE

BACKGROUND OF THE INVENTION

This invention relates generally to automatic hay baling machines of the type using means to convey the hay material from a receiving platform into a bale chamber, through an opening in the side thereof, in timed relation to a reciprocating plunger in the chamber. Specifically, the invention relates to a feeding mechanism for the type of baler above described.

The current trend in hay baling machines is to design a machine which is capable of operating speeds well in excess of the current operating speeds of 60 and 80 plunger reciprocations or strokes per minute. Current designs are attempting to achieve plunger speeds in excess of 100 strokes per minute. Most of the presently available baling machines are not adapted to achieve these high plunger speeds, however, without considerable redesign of their operating components. In the machine redesign, the engineer must keep in mind that vibrations are to be kept to a minimum, that overall size not be overly increased and the ultimate cost to the consumer be kept within reasonable limits. All these aspects of the machine design are usually accomplished if the components are of simple, practical design.

SUMMARY OF THE INVENTION

Accordingly then, the principle object of the present invention is to provide a hay baling machine which is capable of achieving speeds in excess of 100 plunger strokes per minute while still being of simple, practical design.

Another object of the invention is to provide a slower operational speed for the feed fingers in comparison to a plunger operated system where the feed fingers must sweep the full length of the feeder platform on the forward stroke of the plunger.

A further object of the invention is to provide a feeder mechanism which is effective to reduce or minimize vibrations in the machine.

Still further, an object of the present invention is to provide a feeder mechanism which will make essentially a complete sweep of the feeder chamber of each plunger cycle.

Another object of the invention is to provide a feeder mechanism which utilizes the motion of the plunger for the feeding operation in both directions.

Yet another object of the invention is to effect a cost saving both in manufacture and in retail price by reducing the number of necessary components usually used in conventional baling machines.

BRIEF DESCRIPTION OF THE DRAWINGS

FIG. 1 is a fragmentary plan section view of a hay baler having a feeder mechanism constructed in accordance with the invention.

FIG. 2 is a section view taken along the line 2-2 of FIg. 1, showing the feeder mechanism in retracted position in solid lines and in the extended position in dot-dash lines.

FIG. 3 is an enlarged longitudinal section of the feeder mechanism taken on the line 3-3 of FIG. 4.

FIG. 4 is a plan view of the proposed feeder mechanism.

FIG. 5 is a cross section taken on the line 5-5 of FIG. 4.

DESCRIPTION OF THE PREFERRED EMBODIMENT

Referring to FIG. 1, a hay baling machine, designated generally by the numeral 10, includes a fore-and-aft extending bale case or chamber 12, having a top wall 14, an outside wall 16, an inside wall 18 and a bottom wall 20. An infeed opening 22 is provided in wall 18 and a slot 24 is provided in the top wall adjacent to the infeed opening. A plunger 26 is reciprocably mounted in the bale chamber 12 and is driven by a crank arm 28 which is drivingly connected by one end thereof to a connecting rod 30. The other end of rod 30 is connected to the plunger 26. The crank arm 28 is driven through a gearbox 32 through connecting output shaft 34.

2

A pickup mechanism 36 is mounted in a transverse relation to the fore-and-aft extending bale chamber 12, as shown in FIG. 1. The pickup mechanism 36 is comprised of a reel 38, having a plurality of tines 40 mounted thereon, stripper plates 42, a reel shaft 43, properly journaled for rotation about its longitudinal axis, and a drive sprocket 44. The drive sprocket 44 is suitably driven through a conventional drive train not shown.

The reel 38 rotates and the tines 40 sweep cut crop material upwardly to a hay receiving platform 46 which extends transverse to the bale case 12. The hay receiving platform 46 and a rearwardly disposed vertical wall 48 form a feed chamber 50. The feed chamber is in communication with the bale chamber 12 through the infeed opening 22.

Referring now to FIGS. 1 and 2, the baler feeding means is comprised, in part, by track means which includes upper and lower track members 52 and 54, mounted above the platform 46 and extending parallel thereto. The track member 52 is comprised of a pair of spaced apart, parallel tracks 60 and 62. The tracks 60 and 62 extend from outside wall 16 of the bale chamber, over the slotted area 24 and out over the feeder chamber to a point substantially midway thereof. The other track member 54 is also comprised of a pair of spaced apart, parallel tracks 56 and 58. These tracks are disposed below tracks 60 and 62 and overlap at substantially the mid area of the feeder chamber, as shown in FIG. 2. The tracks 56 and 58 then extend from the mid area toward outside wall 68 of the feeder chamber and are supported thereby. Each track member 52 and 54 is adapted to have a carriage 70 and 72, respectively, reciprocally mounted therein.

Referring now to FIGS. 3, 4 and 5, showing the detailed construction of the track means and carriages which form the feeding means, each of the tracks 56, 58, 60 and 62 are formed from U-shaped channel sections. The upper tracks 60, 62 have a shallower U-opening than the lower tracks 56 and 58. At the center of the feeder chamber where the tracks overlap, the tracks are mounted in side by side relation with the two track members being welded together, as shown in FIG. 5.

Each of the carriages 70 and 72 is provided with frame members 74 and 76. Carriage 70, and its associated frame 76, if provided with a horizontally extending shaft 80, extending through and supported by the spaced apart frame members 76, as shown in FIG. 4, and a pair of horizontally extending stub shafts 82. The shaft 80 is mounted in the frame at the end thereof remote from bale chamber 12 and the stub shafts 82 extend horizontally through each frame member at the end close to the bale case. On the outward end of each of the shafts 80 and 82 there are mounted rollers or bearings 86 which are adapted to be received and guided in the U-shaped tracks, as shown in FIGS. 3, 4 and 5.

The carriage 72, and its associated frame members 74, are disposed in the upper track and is comprised of a pair of parallel, spaced apart, horizontally extending shafts 78 which extend through the frame members and have rollers or bearings 84 at the outer end thereof. As is the case with carriage 70, the rollers are engageable in the U-shaped tracks and are adapted to roll therein.

Each of the carriages 70 and 72 is provided with a plurality of spring biased feeder fingers which are fixed to the various shafts and depend into the feeder chamber therefrom. Carriage 70 is provided with a pair of fingers 90, one mounted on each of the stub shafts 82 inside the frame members 76. A third finger 92 is fixed to rearward shaft 80, centrally thereof. Each of these fingers 90 and 92 are lightly biased by springs 96 and 98, respectively, to an upward position (not shown) from the crop engaging or load position, best shown in FIG. 3. This is the position assumed by the fingers when they engage crop material in the feeder chamber and convey it thereacross from left to right, as viewed in FIG. 2.

On carriage 72 there is provided a pair of feeder fingers 88 mounted on the shaft 78 disposed on the carriage end close to the bale case. The fingers 88 are longer than the fingers 90 and 92 because of the one above the other relation of the carriages and the need for those fingers to sweep close to the hay receiving platform. The fingers 88 are so disposed on shaft 78 that they are mounted within the frame members 74 and within the inner ends of stub shafts 82 so that as the carriages reach the center position, the position of overlap, the fingers 88 do not contact or interfere with the movement of the lower carriage. The overlapping relationship of the carriages is best shown in FIG. 3. The fingers 88 are also spring biased by springs 94 which urge the fingers into an up position from the crop engaging position shown in FIG. 3. This type of biasing arrangement for the fingers is conventional.

Carriage 70 is provided with a lug 100 which is fixed to and extends upwardly from the shaft 80 located furthest from the bale case. Carriage 72 is provided with a depending lug 102 which is fixed to the shaft 78, the shaft disposed furthest from the bale case. Both the lugs, 100 and 102, are mounted as close as possible to the center line of the respective carriages for reasons to be more fully explained hereinafter.

A drive means 104 is provided to transfer motive power to the carriages 70 and 72. The drive means 104 comprises an endless chain having an inner reach 106 and an outer reach 108, as shown in FIG. 1. The chain is driven over a sprocket 110, suitably rotatably disposed in a bracket 112 and which is fixed to and extends from wall 16 of the bale chamber. The chain drives a sprocket 114, shown in FIG. 2, which is mounted on a vertically disposed shaft 116. The shaft 116 is journaled for rotation in brackets 118 which extend outwardly from wall 16 of the bale case. At the upper end of shaft 118 there is mounted a sprocket 120 which turns with the shaft 116. The drive means 104 is driven by the plunger 26 as it reciprocates back and forth in the bale case. A bracket 122 is fixed to the plunger by one end and connected to inner reach 106 by the other end. The reciprocable motion of the plunger is transmitted from the chain to sprocket 114 through shaft 116 to sprocket 120.

A length of chain 124 illustrated in FIG. 1, is engageable with sprocket 120. One end of the chain 124 is fixed to lug 102 on carriage 72, the upper carriage. The other end of the chain 124 is fixed to one end of a rod 136. A second rod 126 is connected by one end to lug 102. The other end of the rod 126 extends away from the bale alined, toward a sprocket 128, rotatably mounted on shaft 130 which is mounted in bracket 132. The other end of rod 126 is fixed to one end of a second length of chain 134 which is engageable with sprocket 128. The other end of chain 134 is connected to lug 100 on carriage 70. Also connected to lug 100 is the other end of rod 136. As seen in FIGS. 1, 3 and 4, each rod 126 and 136 is connected to its respective lug by means of an adjustment device 138, 140, respectively. The adjustment devices 138 and 140 are threadably engageable with the rods and effect either a lengthening or shortening of the connection by rotation thereof with respect to the rods. Idler sprockets 142 and 146 are rotatable on their shafts 144 and 148 and are so positioned that the chains 124 and 134 and the rods 126 and 136 are kept as close as possible to the center line of the track means. With the lugs and the connected rods and chains positioned as close to the center of the carriages as possible so as to still permit overlap of the carriages, the motive force applied to the carriages by the plunger is smooth and aligned, resulting in good wear characteristics and a smooth ride of the carriages in the track members.

In operation, the plunger 26 is reciprocated by turning crank arm 28. The plunger travels in the bale chamber from a point shown by the dot-dash lines at the bottom of FIG. 1 to a position past the infeed opening 22 shown at the top of FIG. 1. In so doing the bracket 122 fixed to the plunger causes the drive means 104 to move. First, there is movement in one direction as the plunger moves rearwardly, and then there is movement in the other direction as the plunger moves forwardly in the bale case. This motion is then transferred to the carriages through the shafts, sprockets, chains, and rods. The plunger, therefore, is utilized for feeding in both the forward bale forming stroke and the return stroke.

The lower carriage 70 moves back and forth across the left half of the bale case, as viewed in FIGs. 1 and 2, from wall 68 to the center of feeder chamber. The depending fingers 90 and 92 engage the cut crop material delivered to the hay receiving platform 46 by the reel and tines 38 and 40. Finger 92 functions to sweep hay from the left most end of the bale chamber and together the fingers 90 and 92 serve to sweep hay toward the bale case and the carriage 72.

The upper carriage 72 reciprocates between the feeder chamber center and the bale chamber. The depending feeder teeth 88 pass through infeed opening 22 and between the slots 24 into the bale case delivering hay thereto for formation into a bale by the plunger. The dot-dash lines in FIG. 2, show the carriages and their associated fingers at the extremes of the strokes. The distance traversed by each carriage can be manipulated by working the adjustment means 138 and 140.

Since the spring means associated with each of the feed fingers biases them up when there is no load applied to them, the fingers will assume an upwardly inclined position during a portion of the cycle. The load condition is achieved when a charge of hay is conveyed across the platform. The upwardly biased feature permits the fingers to raise up out of the way of hay on the platform during a return stroke so that there will be little or no interference with the hay as the carriage moves back across the feeder chamber to begin another sweep thereof. The timing of the carriages is such that carriage 70 is delivering hay to the center of the feeder chamber as the carriage 72 is being returned from the bale chamber. The fingers 88 will be in the upward position and they will drop down behind the charge delivered by carriage 70 and positively strip the material from fingers 90 and 92 as carriage 72 moves toward the bale case again. This arrangement is not specifically shown, but it will be well understood by those skilled in the art and is easy to see from the overlapping arrangement of the carriages at the chamber center, as shown in FIG. 2.

Through this arrangement of elements the hay material will be moved toward the bale case with each movement of the plunger, either backward or forward. This relationship is specifically helpful and useful as the plunger speeds approach and exceed 100 strokes per minute. With each movement of the plunger hay is being delivered toward the bale case. Since the carriage must move only half way across the feeder chamber, the speed thereof need be only about half as fast as the speed of a carriage which would travel across the entire feeder chamber. This lessens the problems involved with providing feeding means which travel faster and have feed fingers that sweep the full length of the feeder chamber in the forward or bale forming stroke of the plunger.

The system hereinbefore described has additional advantages inasmuch as the design permits a low baler profile, it eliminates the feeder gearbox found on conventional balers, there is a complete sweep of feeder chamber for each plunger cycle and the motion of the two carriages, in direct opposition to each other, balances and reduces the vibration established in the baler. The latter advantage is particularly important as the machine speeds increase.

While this invention has been described in connection with a single embodiment thereof, it will be understood that this embodiment is capable of modification and that this application is intended to cover any variation, uses, or adaptations following, in general, the principles of the invention and including such departures from the present disclosure as come within the known or customary practice in the art to which the invention pertains, and as fall within the scope of the invention or the limits of the appended claims.

I claim:

1. A hay baler comprising a generally horizontally extending bale chamber having an infeed opening in one side wall thereof, a plunger reciprocable in said bale chamber past said opening, a hay receiving platform extending laterally from said infeed opening, feeding means above said platform for conveying hay in a generally horizontal plane across said platform through said opening and into said bale chamber, said feeding means comprising track means extending transverse relative to said bale chamber, a first and second carriage means mounted on said track means, means for reciprocating said carriages toward and away from said bale chamber, said first carriage reciprocating between a position remote from said bale chamber to a position intermediate said receiving platform and said second carriage reciprocating between a position intermediate said receiving platform and said bale chamber, and said carriage means having fingers depending therefrom.

2. A hay baler, as recited in claim 1, wherein said carriages are reciprocated toward and away from said bale chamber and toward and away from each other by endless drive means and said drive means being driven by said reciprocating plunger whereby said first carriage delivers hay from the remote end of said hay receiving platform toward an intermediate region thereof and positively transfers the hay to said second carriage in said region and said second carriage delivers the hay through the infeed opening into said bale chamber.

3. A hay baler, as recited in claim 1, wherein said track means include upper and lower track members, each of said upper and lower track members comprised of a pair of laterally spaced parallel tracks, said upper tracks extending away from said bale chamber terminating intermediate the ends of said hay receiving platform and said lower tracks extending from adjacent the remote end of said upper track to a point more remote from said bale chamber.

4. A hay baler, as recited in claim 3, wherein said first carriage is mounted in said lower track member and includes a rectangular frame, having a first shaft extending parallel to said bale case extending therethrough and a pair of stub shafts mounted in said frame spaced from said first shaft and parallel thereto, said first shaft being located at one end of said carriage remote from said bale chamber and said stub shafts being located at the other end of said carriage toward said bale chamber, said shafts having ends projecting beyond said carriage frame, and a plurality of bearing members, one on each shaft projection, for engaging said lower tracks.

5. A hay baler, as recited in claim 4, wherein a plurality of said biased feed fingers depend from said first carriage, said fingers being fixed to said shafts.

6. A hay baler, as recited in claim 5, wherein said first carriage carries three feed fingers, one on said first shaft and one on each of said stub shafts.

7. A hay baler, as recited in claim 3, wherein said second carriage is mounted in said upper track member and includes a rectangular frame having a pair of spaced apart parallel shafts extending therethrough, one shaft being located at end of the carriage remote from said bale chamber and the other being located at the end of the carriage toward said bale chamber, said shafts having ends projecting beyond said carriage frame, and a plurality of bearing members, one on each shaft projection, for engaging said upper tracks.

8. A hay baler, as recited in claim 7, wherein a plurality of said biased feed fingers depend from said second carriage, said fingers being fixed to said shaft toward said bale chamber.

9. A hay baler, as recited in claim 8, wherein said second carriage carries two fingers mounted in spaced apart relation adjacent the center of the shaft.

10. A hay baler comprising, in combination, a generally horizontally extending bale chamber having an infeed opening in one side wall thereof, a plunger reciprocable in said bale chamber past said opening, a hay receiving platform extending laterally from one bale chamber side wall and said infeed opening, feeding means above said platform for conveying hay in a generally horizontal plane across said platform through said opening and into said bale chamber, said feeding means comprising track means extending outwardly of said bale chamber over said receiving platform and generally parallel thereto, first and second carriage means movable along said track means, said carriages having biased feed fingers depending therefrom for engaging hay, means for reciprocating said carriages toward and away from said bale chamber, said first carriage reciprocating between a position remote from said bale case to a position intermediate said receiving platform and said second carriage reciprocating between a position intermediate said receiving platform and said bale chamber.